United States Patent
Fang et al.

(10) Patent No.: US 10,755,649 B2
(45) Date of Patent: Aug. 25, 2020

(54) METHOD AND APPARATUS FOR DRIVING ELECTROPHORETIC DISPLAY PANEL, AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Haobo Fang, Beijing (CN); Yanna Xue, Beijing (CN); Zhiying Bao, Beijing (CN); Yong Zhang, Beijing (CN); Lei Mi, Beijing (CN); Lu Bai, Beijing (CN); Gang Hua, Beijing (CN); Jingpeng Wang, Beijing (CN); Lingxiang Yuan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/316,943

(22) PCT Filed: May 14, 2018

(86) PCT No.: PCT/CN2018/086684
§ 371 (c)(1),
(2) Date: Jan. 10, 2019

(87) PCT Pub. No.: WO2019/029209
PCT Pub. Date: Feb. 14, 2019

(65) Prior Publication Data
US 2019/0228716 A1 Jul. 25, 2019

(51) Int. Cl.
*G09G 3/34* (2006.01)
*G02F 1/167* (2019.01)

(52) U.S. Cl.
CPC ............. *G09G 3/344* (2013.01); *G02F 1/167* (2013.01); *G09G 2230/00* (2013.01);
(Continued)

(58) Field of Classification Search
CPC ............... G09G 3/344; G09G 2230/00; G09G 2310/061; G09G 2310/068; G09G 2330/021; G02F 1/167
See application file for complete search history.

(56) References Cited

U.S. PATENT DOCUMENTS

| | | | |
|---|---|---|---|
| 6,600,472 B1 * | 7/2003 | Nakai | G09G 3/2011 345/205 |
| 2002/0033784 A1 | 3/2002 | Machida et al. | |

(Continued)

FOREIGN PATENT DOCUMENTS

| | | |
|---|---|---|
| CN | 1479153 A | 3/2004 |
| CN | 1799083 A | 7/2006 |

(Continued)

OTHER PUBLICATIONS

PCT International Search Report, Application No. PCT/CN2018/086684, dated Jul. 16, 2018, 5 pages: with English translation.
(Continued)

*Primary Examiner* — Towfiq Elahi
(74) *Attorney, Agent, or Firm* — Armstrong Teasdale LLP

(57) ABSTRACT

Embodiments of the present disclosure provide a method and apparatus for driving an electrophoretic display panel, and a display device. The electrophoretic display panel includes a first electrode layer, a second electrode layer, and charged particles distributed between the first electrode layer and the second electrode layer. In the method for driving an
(Continued)

electrophoretic display panel, a direct current voltage signal is applied to the first electrode layer to cause the charged particles to move to a predetermined position. An alternating current voltage signal is applied to the first electrode layer to cause the charged particles to oscillate. A data voltage signal is applied to the first electrode layer for display. After the charged particles oscillate, the motion activity can be improved, so that the charged particles may more accurately move according to the data voltage signal, thereby improving display accuracy.

13 Claims, 5 Drawing Sheets

(52) U.S. Cl.
CPC . *G09G 2310/061* (2013.01); *G09G 2310/068* (2013.01); *G09G 2330/021* (2013.01)

(56) References Cited

U.S. PATENT DOCUMENTS

2006/0244714 A1* 11/2006 Zhou ..................... G09G 3/344
345/107

2014/0078035 A1* 3/2014 Sato ..................... G09G 3/344
345/107

FOREIGN PATENT DOCUMENTS

| CN | 103680426 A | 3/2014 |
| CN | 105070254 A | 11/2015 |
| CN | 105139811 A | 12/2015 |
| CN | 105593923 A | 5/2016 |
| CN | 106023906 A | 10/2016 |
| CN | 107003583 A | 8/2017 |
| CN | 107342057 A | 11/2017 |

OTHER PUBLICATIONS

PCT Written Opinion, Application No. PCT/CN2018/086684, dated Jul. 16, 2018, 6 pages.: with English translation of relevant part.
China First Office Action, Application No. 201710675781.8, dated Dec. 20, 2018, 19 pps.: with English translation.
China Second Office Action, Application No. 201710675781.8, dated May 29, 2019, 21 pps.: with English translation.

* cited by examiner

METHOD AND APPARATUS FOR DRIVING ELECTROPHORETIC DISPLAY PANEL, AND DISPLAY DEVICE

CROSS REFERENCE TO RELATED APPLICATIONS

This patent application is a National Stage Entry of PCT/CN2018/086684 filed on May 14, 2018, which claims the benefit and priority of Chinese Patent Application No. 201710675781.8 filed on Aug. 9, 2017, the disclosures of which are incorporated by reference in their entirety as part of the present application.

BACKGROUND

The present disclosure relates to display technologies, and in particular, to a method and apparatus for driving an electrophoretic display panel, and a display device.

An electrophoretic display device, such as an electronic paper display device, has the same display characteristics as conventional paper, and has the advantages of low energy consumption, light weight, and flexibility. It has been applied to more and more fields.

In the electrophoretic display panel of the electrophoretic display device, different driving voltages are applied, to make charged particles with different colors to move to the visible surface of the electrophoretic display panel, so as to present contents such as images. After the display is completed, even if the application of the driving voltage is stopped, the state of the charged particles does not change, thereby maintaining the displayed content.

How to effectively drive charged particles in electrophoretic display panels is always a research hotspot in this technical field. There is room for improvement in the method and apparatus for driving an electrophoretic display panel, and the display device.

BRIEF DESCRIPTION

Embodiments of the present disclosure provide a method and apparatus for driving an electrophoretic display panel, and a display device.

A first aspect of the present disclosure provides a method for driving an electrophoretic display panel, wherein the electrophoretic display panel includes a first electrode layer, a second electrode layer, and charged particles distributed between the first electrode layer and the second electrode layer. The method for driving an electrophoretic display panel includes applying a direct current voltage signal to the first electrode layer to cause charged particles to move to a predetermined position, applying an alternating current voltage signal to the first electrode layer to cause charged particles to reciprocate, and applying a data voltage signal to the first electrode layer for display.

In embodiments of the present disclosure, the alternating current voltage signal is a square wave voltage signal.

In embodiments of the present disclosure, the duty ratio of the square wave voltage signal is about 50%.

In embodiments of the present disclosure, the frequency of the alternating current voltage signal is greater than or equal to about 24 Hz.

In embodiments of the present disclosure, the frequency is greater than or equal to about 30 Hz.

In embodiments of the present disclosure, the alternating current voltage signal is applied after applying the direct current voltage signal.

In embodiments of the present disclosure, the alternating current voltage signal is applied prior to applying the direct current voltage signal.

In embodiments of the present disclosure, the duration of the alternating current voltage signal is less than or equal to the duration of the direct current voltage signal.

In embodiments of the present disclosure, the duration of the alternating current voltage signal is less than or equal to half of the duration of the direct current voltage signal.

In embodiments of the present disclosure, the method for driving an electrophoretic display panel further includes applying a compensation voltage signal to the first electrode layer according to a magnitude and a duration of the direct current voltage signal and a magnitude and a duration of the data voltage signal, such that the time during which a positive voltage is applied to the first electrode layer is equal to the time during which a negative voltage is applied to the first electrode layer.

In embodiments of the present disclosure, the compensation voltage signal is applied prior to applying the direct current voltage signal.

In embodiments of the present disclosure, the first electrode layer is a pixel electrode layer and the second electrode layer is a common electrode layer.

In embodiments of the present disclosure, the electrophoretic display panel is an electronic paper display panel.

A second aspect of the present disclosure provides an apparatus for driving an electrophoretic display panel, wherein the electrophoretic display panel includes a first electrode layer, a second electrode layer, and charged particles distributed between the first electrode layer and the second electrode layer. The apparatus for driving an electrophoretic display panel includes a first circuit, a second circuit, and a data voltage circuit connected to the first electrode layer. The first circuit is configured to apply a direct current voltage signal to the first electrode layer to cause the charged particles to move to a predetermined position. The second circuit is configured to apply an alternating current voltage signal to the first electrode layer to cause the charged particles to oscillate. The data voltage circuit is configured to apply a data voltage signal to the first electrode layer for display.

In embodiments of the present disclosure, the apparatus for driving an electrophoretic display panel further includes a compensation voltage circuit connected to the first electrode layer. The compensation voltage circuit is configured to apply a compensation voltage signal to the first electrode layer according to a magnitude and a duration of the direct current voltage signal and a magnitude and duration of the data voltage signal, such that the time during which a positive voltage is applied to the first electrode layer is equal to the time during which a negative voltage is applied to the first electrode layer.

A third aspect of the present disclosure provides a display device including an electrophoretic display panel, and the apparatus for driving the electrophoretic display panel of any of the above. The electrophoretic display panel includes a first electrode layer, a second electrode layer, and charged particles distributed between the first electrode layer and the second electrode layer.

Based on the method and apparatus for driving an electrophoretic display panel, and the display device according to the embodiments of the present disclosure, charged particles for display oscillate at a predetermined position, and the motion activity of the charged particles may be improved, so that the charged particles may move more accurately according to the data voltage signal, and the display accuracy is improved.

BRIEF DESCRIPTION OF THE DRAWINGS

In order to more clearly illustrate the technical solutions of embodiments of the present disclosure, the accompanying drawings of the embodiments will be briefly described below. It should be noted that the drawings described below relate only to some embodiments of the present disclosure, rather than to limitations of the present disclosure, wherein.

DETAILED DESCRIPTION

In order to make the technical solutions and advantages of the embodiments of the present disclosure clearer, a clear and complete description of the technical solutions of the embodiments of the present disclosure will be given below in conjunction with the accompanying drawings. Obviously, the described embodiments are part of the embodiments of the present disclosure, not all of them. Based on the embodiments of the present disclosure described, all other embodiments obtained by those skilled in the art without the need for creative work also fall within the scope of the protection of the present disclosure.

Figure 1:
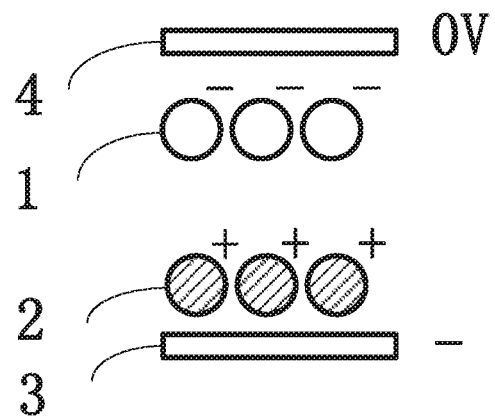
FIG. 1 is an exemplary schematic diagram of an electrophoretic display panel.

FIG. 1 is an exemplary schematic diagram of an electrophoretic display panel. As a simple example, the electrophoretic display panel of FIG. 1 includes first charged particles 1 and second charged particles 2. The first charged particles 1 may be white and have negative charges. The second charged particles 2 may be black and have positive charges. The first charged particles 1 and the second charged particles 2 are distributed between the first electrode layer 3 and the second electrode layer 4. When the voltages applied to the first electrode layer 3 and the second electrode layer 4 change, the states of the first charged particles 1 and the second charged particles 2 are changed, thereby changing the displayed content.

As an example, the first electrode layer 3 may be a pixel electrode layer 3, and the second electrode layer 4 may be a common electrode layer 4 having a voltage of 0V. When a negative voltage is applied to the pixel electrode layer 3, the second charged particles 2 move toward the pixel electrode layer 3, and the first charged particles 1 move toward the common electrode layer 4. The common electrode layer 4 may be a transparent electrode for display. At this time, the portion shown in FIG. 1 will appear white. Thereafter, even if the application of the voltage to the pixel electrode layer 3 is stopped, the state of the charged particles does not change, and the content displayed on the electrophoretic display panel may be maintained. When a positive voltage is applied to the pixel electrode layer 3, the first charged particles 1 move toward the pixel electrode layer 3, and the second charged particles 2 move toward the common electrode layer 4. At this time, the portion shown in FIG. 1 will appear black. By applying different voltages at different positions of the first electrode layer 3, the electrophoretic display panel as a whole may present a pattern or a character.

It should be understood that FIG. 1 shows only one example of an electrophoretic display panel, and the application environment of the embodiment of the present disclosure is not limited thereto. The electrophoretic display panel may have more kinds of charged particles, and the charged particles may also be grouped and packaged in different tiny containers. The first electrode layer 3 may be divided in various different manners to respectively control the content displayed by respective protons of the electrophoretic display panel.

Figure 2:
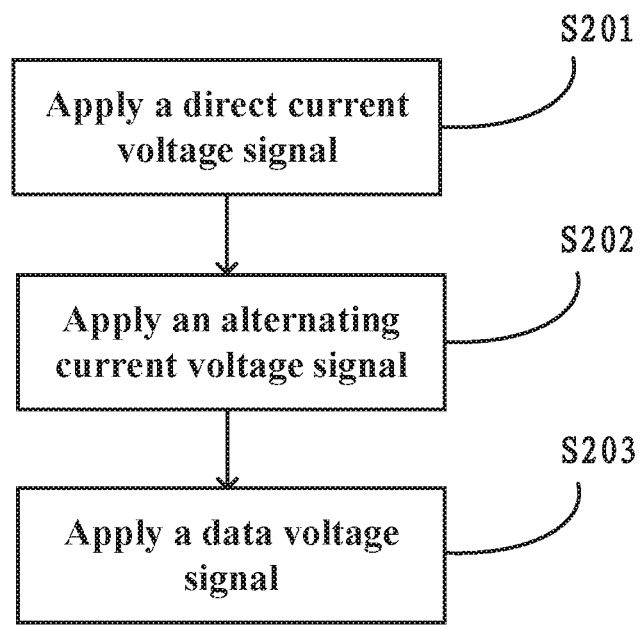
FIG. 2 is a first exemplary flowchart of a method for driving an electrophoretic display panel.

FIG. 2 is a first exemplary flowchart of a method for driving an electrophoretic display panel. As shown in FIG. 2, the method for driving an electrophoretic display panel includes: step S201, applying a direct current voltage signal to the pixel electrode layer 3 to cause the charged particles to move to a predetermined position, step S202, applying an alternating current voltage signal to the pixel electrode layer 3 to cause the charged particles to oscillate, and step S203, apply a data voltage signal to the pixel electrode layer 3 for display.

In step 201, a direct current voltage signal is applied to the pixel electrode layer 3 such that the first charged particles 1 and the second charged particles 2 respectively move to respective predetermined positions.

In step S202, an alternating current voltage signal with a varying magnitude is applied to the pixel electrode layer 3 such that the first charged particles 1 and the second charged particles 2 oscillate near respective predetermined positions, that is, reciprocating with a small amplitude. This may increase the motion activity of the charged particles. After the electrophoretic display panel displays static content for a long time, the charged particles are in the same position for a long time. At this time, the charged particles may be hindered by the surrounding environment (for example, a liquid surrounding the charged particles) and cannot move sensitively in response to the data voltage. The charged particles may overcome such hindrance well after oscillation.

In step S203, a data voltage signal is applied to the pixel electrode layer 3, and the first charged particles 1 and the second charged particles 2 may correctly display new content in response to the data voltage signal. Since the motion activity of the charged particles is increased in step S202, the hindrance which the first charged particles 1 and the second charged particles 2 might suffer may be reduced, and the case that the charged particles cannot move to a predetermined display position may be avoided. The problem that the displayed content is inaccurate is thus avoided.

Figure 3:
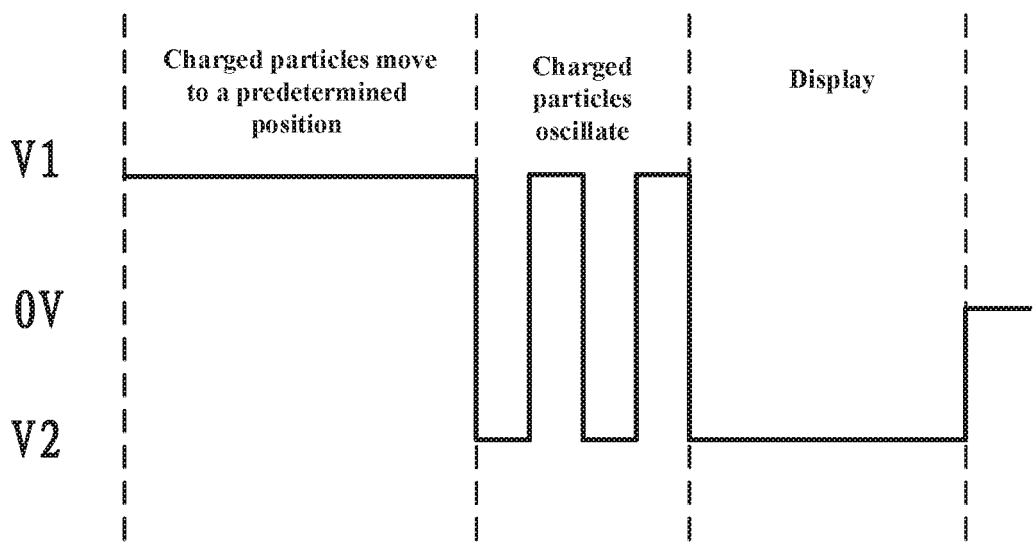
FIG. 3 is an exemplary signal timing diagram corresponding to FIG. 2.

FIG. 3 is an exemplary signal timing diagram corresponding to FIG. 2. FIGS. 4A-4D show the reciprocating motions of charged particles driven by the signal timing of FIG. 3.

Figure 4A:
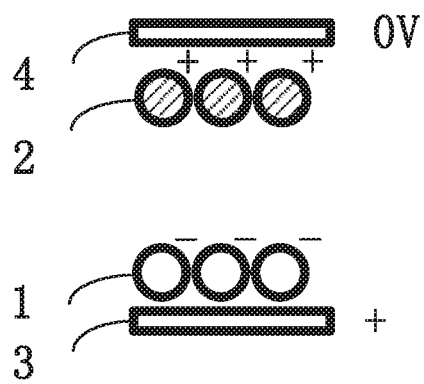
FIGS. 4A-4D show the reciprocating motions of charged particles driven by the signal timing of FIG. 3.
Figure 4B:
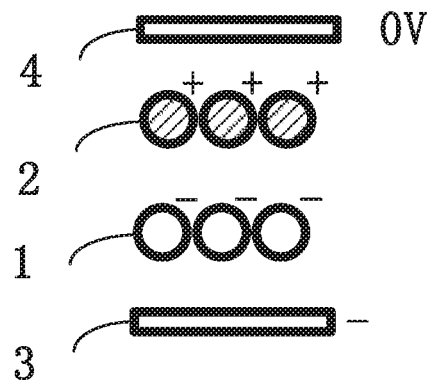
Figure 4C:
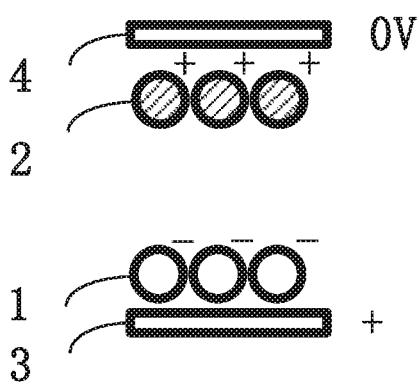
Figure 4D:
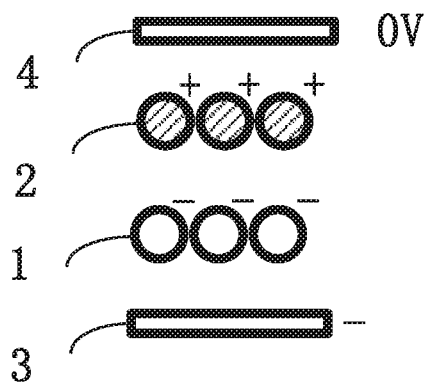

In step 201, a direct current voltage signal having a first amplitude V1 (e.g., a positive value) is applied to the pixel electrode layer 3. As shown in FIG. 4A, the first charged particles 1 move to the vicinity of the pixel electrode layer 3, and the second charged particles 2 move to the vicinity of the common electrode layer 4.

In step S202, the alternating current voltage signal may include various alternating current voltage signals including a sine wave to cause the first charged particles 1 and the second charged particles 2 to reciprocate. For example, the alternating current voltage signal may be a square wave voltage signal to simplify the control process of the drive signal. The square wave voltage signal may have a first amplitude V1 and a second amplitude V2 (e.g., a negative value). The first amplitude V1 and the second amplitude V2 may also be generated by a driving circuit that generates a data voltage signal, which may make full use of the existing driving circuit. FIGS. 4A-4D show the process in which the first charged particles 1 leave the pixel electrode layer 3 (FIG. 4B), approaches the pixel electrode layer 3 (FIG. 4C), and leaves the pixel electrode layer 3 again (FIG. 4D), under the action of the alternating current voltage signal.

The duty ratio of the square wave voltage signal may be about 50%, such that in step S202, the charged particles are subjected to force in two different directions for the same long time, which may prevent the charged particles from being subjected to force in one direction for too long, causing a drop in display performance. Any value within the range of 50%±5%, such as 49%, 51%, etc., is suitable.

The frequency of the alternating current voltage signal may be greater than or equal to about 24 Hz so that the human eye is not aware of a change in an image. This may avoid the occurrence of flicker when switching the displayed content. Further, the frequency may be greater than or equal to about 30 Hz to obtain a better flicker prevention effect. In general, a value greater than 28 Hz may result in an improved flicker prevention effect.

The duration of the alternating current voltage signal may be less than or equal to the duration of the direct current voltage signal to reduce power consumption and shorten driving time. Further, the duration of the alternating current voltage signal is less than or equal to half of the duration of the direct current voltage signal to further reduce power consumption and shorten driving time.

The number of cycles of the alternating current voltage signal may be arbitrarily set. In general, the more the number of cycles, the better the oscillation effect. FIG. 3 shows two cycles, and two or slightly more cycles can maintain low power consumption while achieving a better oscillation effect.

Figure 5:
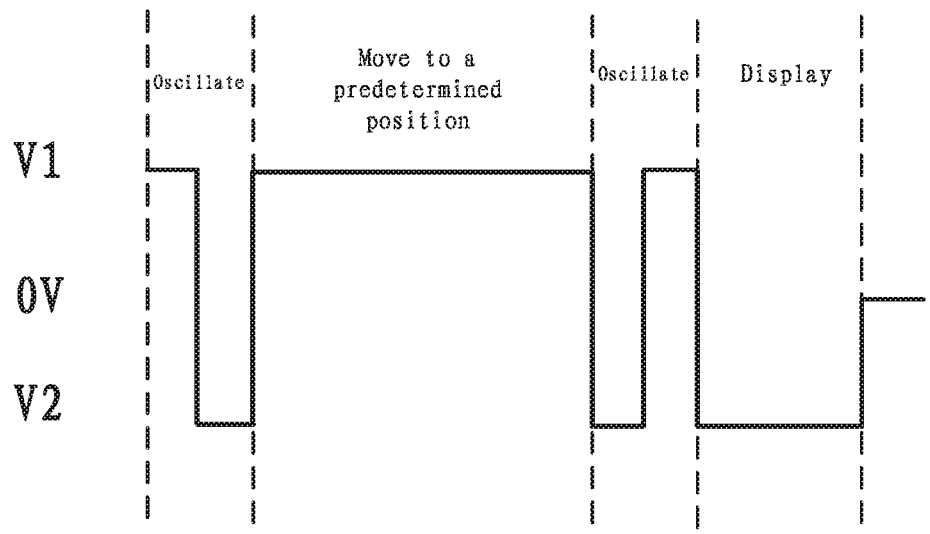
FIG. 5 is a second exemplary signal timing diagram corresponding to FIG. 2.

FIG. 5 is a second exemplary signal timing diagram corresponding to FIG. 2. In embodiments of the present disclosure, an alternating current voltage signal may also be applied prior to applying a direct current voltage signal. FIG. 5 shows the case where step S202 is performed once before and after step S201 respectively, which may cause the charged particles to oscillate before moving a relatively long distance to improve the activity and the accuracy of the moving position.

Figure 6:
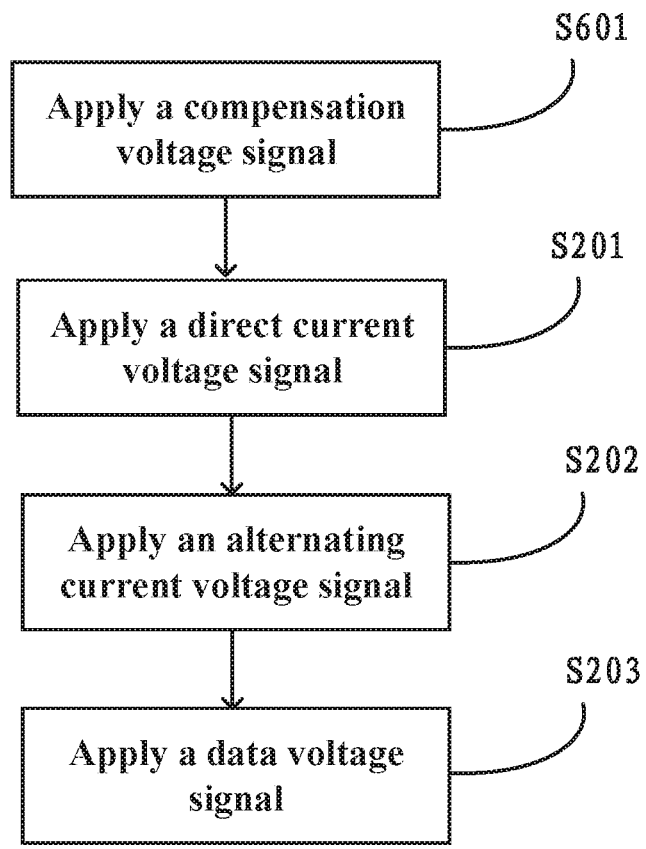
FIG. 6 is a second exemplary flowchart of a method for driving an electrophoretic display panel.

FIG. 6 is a second exemplary flowchart of a method for driving an electrophoretic display panel. As shown in FIG. 6, the method for driving an electrophoretic display panel further includes: step S601, applying a compensation voltage signal to the pixel electrode layer 3 such that the time during a positive voltage is applied to the pixel electrode layer 3 is equal to the time during which a negative voltage is applied to the pixel electrode layer 3.

If the time during which a positive voltage is applied is not equal to the time during which a negative voltage is applied, the charged particles are subjected to more force in one direction. If such a situation lasts for a long time, it may damage the charged particles and affect the display effect. An addition of the compensation phase may avoid this situation.

Since the charged particles are subjected to forces to a substantially same extent in two directions in the reciprocating phase, a compensation voltage signal is applied to the pixel electrode layer according to a magnitude and duration of the direct current voltage signal applied in step S201 and a magnitude and duration of the data voltage signal, such that the time during which a positive voltage is applied to the pixel electrode layer is equal to the time during which a negative voltage is applied to the pixel electrode layer.

Figure 7:
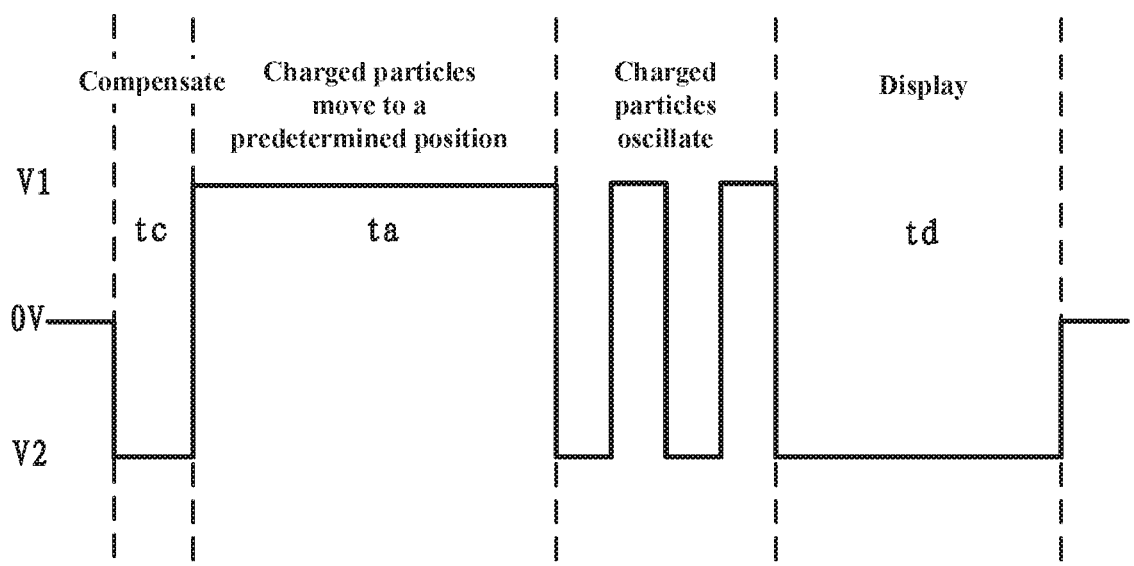
FIG. 7 is an exemplary signal timing diagram corresponding to FIG. 6.

FIG. 7 is an exemplary signal timing diagram corresponding to FIG. 6. In FIG. 7, the direct current voltage signal that causes the charged particles to move to a predetermined position has a first amplitude V1 and a duration of ta. The data voltage signal has a second amplitude V2 and a duration of td.

When ta>td, the amplitude of the compensation voltage signal is the second amplitude V2, the duration is tc, and tc+td=ta. It should be understood that when ta<td, the magnitude of the compensation voltage signal is the first amplitude V1, the duration is tc, and tc+ta=td. When ta=td, no compensation is required.

In addition, when the compensation phase is carried out does not affect the displayed content, therefore, the compensation phase in FIG. 6 and FIG. 7 may also be the compensation for the last previous display process, that is, the value of tc may also be calculated according to "ta" and "td" in the last previous display process.

Figure 8:
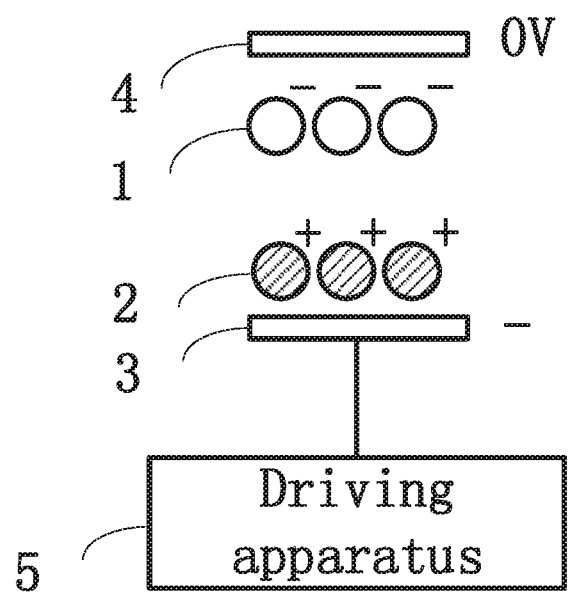
FIG. 8 is an exemplary schematic diagram of an electrophoretic display panel included in a display device, and a driving apparatus thereof.

FIG. 8 is an exemplary schematic diagram of an electrophoretic display panel included in an electronic paper display device and a driving apparatus thereof. As shown in FIG. 8, the display device includes an electrophoretic display panel, and an apparatus 5 (also referred to as a driving apparatus 5) for driving the electrophoretic display panel. The driving apparatus 5 is connected to the pixel electrode layer 3, and applies a voltage to the pixel electrode layer 3 to perform the above-described method for driving the electrophoretic display panel. The display device may be various electrophoretic display devices, and for example, may be various electronic paper display devices that have been applied in many fields at present.

Figure 9:
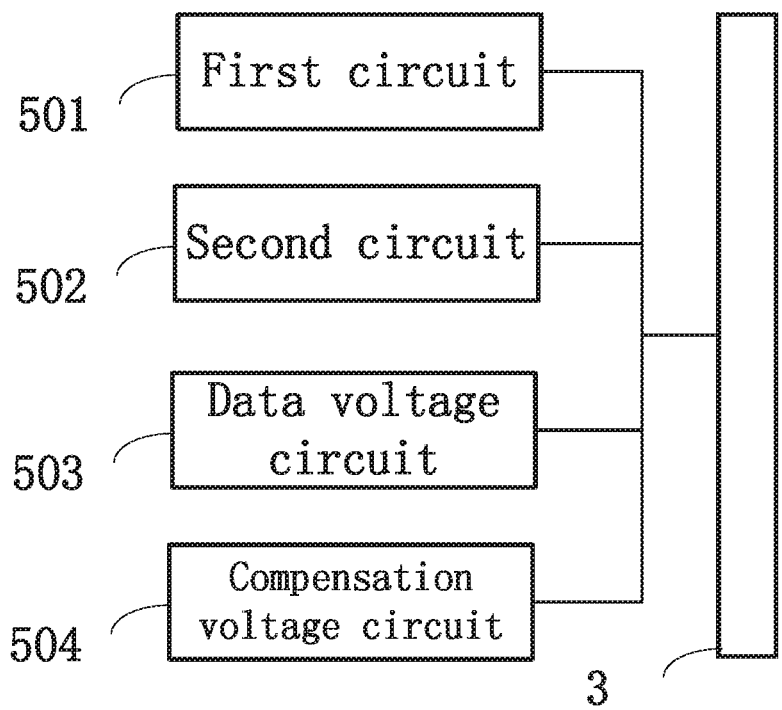
FIG. 9 is a first exemplary structural block diagram of the apparatus for driving an electrophoretic display panel of FIG. 8.

FIG. 9 is a first exemplary structural block diagram of the apparatus for driving an electrophoretic display panel of FIG. 8. As shown in FIG. 9, the driving apparatus 5 includes a first circuit 501 connected to the pixel electrode layer 3, a second circuit 502, and a data voltage circuit 503. The first circuit 501 is configured to apply a direct current voltage signal to the pixel electrode layer 3 to cause the charged particles to move to a predetermined position. The second circuit 502 is configured to apply an alternating current voltage signal to the pixel electrode layer 3 to cause the charged particles to oscillate. The data voltage circuit 503 is configured to apply a data voltage signal to the pixel electrode layer 3 for display.

Further, the driving apparatus 5 of the electronic paper display device may further include a compensation voltage circuit 504 connected to the pixel electrode layer 3. The compensation voltage circuit 504 is configured to apply a compensation voltage signal to the pixel electrode layer 3 such that the time during which a positive voltage is applied to the pixel electrode layer is equal to the time during which a negative voltage is applied to the pixel electrode layer.

The compensation voltage circuit 504 may apply a compensation voltage signal to the pixel electrode layer 3 according to the magnitude and duration of the direct current voltage signal and the magnitude and duration of the data voltage signal, such that the time during which a positive voltage is applied to the pixel electrode layer 3 is equal to the time during which a negative voltage is applied to the pixel electrode layer.

The first circuit 501, the second circuit 502, the data voltage circuit 503, and the compensation voltage circuit 504 may use any dedicated or general-purpose circuit structure, and may include software, hardware, or a combination thereof, for example, various analog or digital voltage generators or signal generators.

Figure 10:
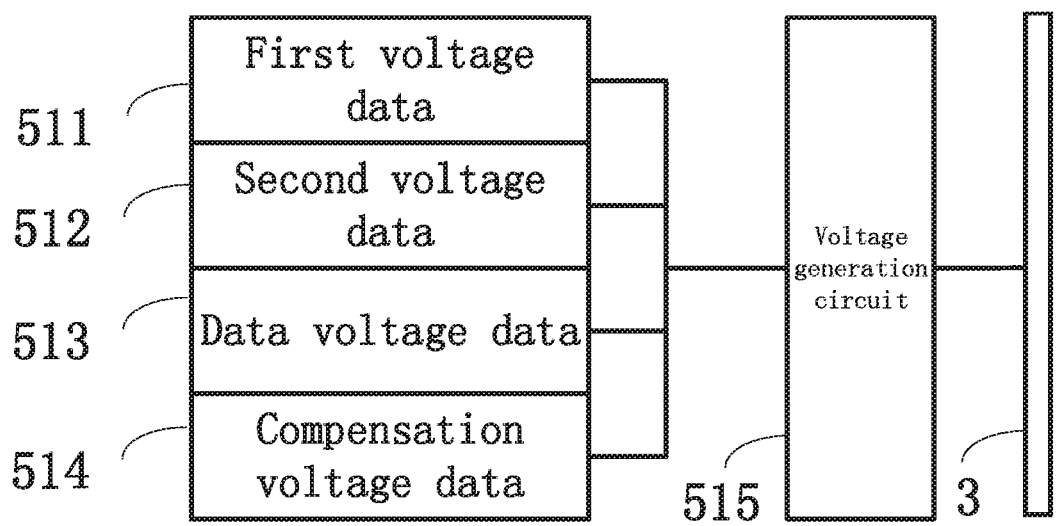
FIG. 10 is a second exemplary structural block diagram of the apparatus for driving an electrophoretic display panel of FIG. 8.

FIG. 10 is a second exemplary structural block diagram of the apparatus for driving an electrophoretic display panel of FIG. 8. As shown in FIG. 10, in one embodiment, the driving apparatus 5 includes a data storage device in which first voltage data 511, second voltage data 512, data voltage data 513, and compensation voltage data 514 are stored. These data can be transmitted to the same voltage generation circuit 515 to generate different voltages and apply them to the pixel electrode layer 3. The structure of FIG. 10 may be implemented in any electronic paper driving chip, or a microcontroller system such as a single chip microcomputer, a digital signal processor, or a programmable logic gate array.

The method and apparatus for driving an electrophoretic display panel, and the display device according to the embodiments of the present disclosure cause charged particles for display to oscillate at a predetermined position, and may improve the motion activity of the charged particles, so that the charged particles may move more accurately according to the data voltage signal, improving display accuracy.

It is to be understood that the above embodiments are merely exemplary embodiments employed to explain the principles of the present disclosure, but the present disclosure is not limited thereto. Various modifications and improvements may be made by those of ordinary skill in the art without departing from the spirit and essence of the present disclosure, and such modifications and improvements are also considered to be within the scope of protection of the present disclosure.

What is claimed is:

1. A method for driving an electrophoretic display panel, wherein the electrophoretic display panel comprises a first electrode layer, a second electrode layer, and charged particles distributed between the first electrode layer and the second electrode layer, the method comprising:
   applying a direct current voltage signal to the first electrode layer to cause the charged particles to move to a predetermined position;
   applying an alternating current voltage signal to the first electrode layer to cause the charged particles to oscillate; and
   applying a data voltage signal to the first electrode layer for display;
   wherein the method further comprises:
   applying a compensation voltage signal to the first electrode layer according to a magnitude and a duration of the direct current voltage signal and a magnitude and a duration of the data voltage signal, such that a time during which a positive voltage is applied to the first electrode layer is equal to a time during which a negative voltage is applied to the first electrode layer;
   wherein the compensation voltage signal is applied prior to applying the direct current voltage signal;
   wherein the frequency is greater than or equal to about 30 Hz.

2. The method for driving an electrophoretic display panel according to claim 1, wherein the alternating current voltage signal is a square wave voltage signal.

3. The method for driving an electrophoretic display panel according to claim 2, wherein a duty ratio of the square wave voltage signal is about 50%.

4. The method for driving an electrophoretic display panel according to claim 1, wherein the alternating current voltage signal is applied after applying the direct current voltage signal.

5. The method for driving an electrophoretic display panel according to claim 1, wherein the alternating current voltage signal is applied prior to applying the direct current voltage signal.

6. The method for driving an electrophoretic display panel according to claim 1, wherein a duration of the alternating current voltage signal is less than or equal to a duration of the direct current voltage signal.

7. The method for driving an electrophoretic display panel according to claim 6, wherein the duration of the alternating current voltage signal is less than or equal to half of the duration of the direct current voltage signal.

8. The method for driving an electrophoretic display panel according to claim 1, wherein the first electrode layer is a pixel electrode layer and wherein the second electrode layer is a common electrode layer.

9. The method for driving an electrophoretic display panel according to claim 1, wherein the electrophoretic display panel is an electronic paper display panel.

10. An apparatus for driving an electrophoretic display panel, wherein the electrophoretic display panel comprises a first electrode layer, a second electrode layer, and charged particles distributed between the first electrode layer and the second electrode layer, wherein the apparatus for driving an electrophoretic display panel comprises a first circuit, a second circuit, and a data voltage circuit connected to the first electrode layer;
   wherein the first circuit is configured to apply a direct current voltage signal to the first electrode layer to cause the charged particles to move to a predetermined position;
   wherein the second circuit is configured to apply an alternating current voltage signal to the first electrode layer to cause the charged particles to oscillate; and
   wherein the data voltage circuit is configured to apply a data voltage signal to the first electrode layer for display;
   wherein the apparatus for driving an electrophoretic display panel further comprises a compensation voltage circuit connected to the first electrode layer,
   wherein the compensation voltage circuit is configured to apply a compensation voltage signal to the first electrode layer according to a magnitude and a duration of the direct current voltage signal and a magnitude and a duration of the data voltage signal, such that a time during which a positive voltage is applied to the first electrode layer is equal to a time during which a negative voltage is applied to the first electrode layer;
   wherein the compensation voltage signal is applied prior to applying the direct current voltage signal;
   wherein the frequency is greater than or equal to about 30 Hz.

11. A display device comprising:
   an electrophoretic display panel, comprising a first electrode layer, a second electrode layer, and charged particles distributed between the first electrode layer and the second electrode layer; and the apparatus for driving an electrophoretic display panel according to claim 10.

12. The method for driving an electrophoretic display panel according to claim 2, wherein the alternating current voltage signal is applied after applying the direct current voltage signal.

13. The method for driving an electrophoretic display panel according to claim 3, wherein the alternating current voltage signal is applied after applying the direct current voltage signal.

* * * * *

UNITED STATES PATENT AND TRADEMARK OFFICE
CERTIFICATE OF CORRECTION

PATENT NO. : 10,755,649 B2  
APPLICATION NO. : 16/316943  
DATED : August 25, 2020  
INVENTOR(S) : Haobo Fang et al.

Page 1 of 1

It is certified that error appears in the above-identified patent and that said Letters Patent is hereby corrected as shown below:

On the Title Page

Item (30), in Foreign Application Priority Data, insert therefor -- August 9, 2017 (CN) 201710675781.8 --.

Signed and Sealed this  
Twenty-second Day of December, 2020

Andrei Iancu  
*Director of the United States Patent and Trademark Office*